R. H. SIMPSON.
TIRE VALVE CAP.
APPLICATION FILED SEPT. 29, 1919.

1,349,922.

Patented Aug. 17, 1920.

INVENTOR
Robert H. Simpson

BY Strong & Townsend
ATTORNEYS

UNITED STATES PATENT OFFICE.

ROBERT H. SIMPSON, OF BERKELEY, CALIFORNIA.

TIRE-VALVE CAP.

1,349,922.                Specification of Letters Patent.    Patented Aug. 17, 1920.

Application filed September 29, 1919. Serial No. 327,259.

*To all whom it may concern:*

Be it known that I, ROBERT H. SIMPSON, a citizen of the United States, residing at Berkeley, in the county of Alameda and State of California, have invented new and useful Improvements in Tire-Valve Caps, of which the following is a specification.

This invention relates to a pneumatic tire and particularly pertains to a cap for the valve stem thereof.

It is common practice in the manufacture of pneumatic tires to provide their inner tubes with valve stems which are of considerable length and are externally threaded throughout this length. These threaded stems are then fitted with a valve cap which must be turned down until it strikes a lock nut near the rim. This operation requires some time.

It is the principal object of the present invention to provide a simple tire cap which may be instantly applied to the stem and locked in a position and quickly removed when desired, this cap, at the same time, serving the purpose of a dust cap and a valve cap.

The present invention contemplates the use of a two-part cap, one portion forming an internally threaded sleeve permanently mounted upon the valve stem and the other forming a removable cap member adapted to telescope over the sleeve and engage the same and at the same time to serve as a threaded valve cap.

The invention is illustrated by way of example in the accompanying drawings, in which—

Figure 2:
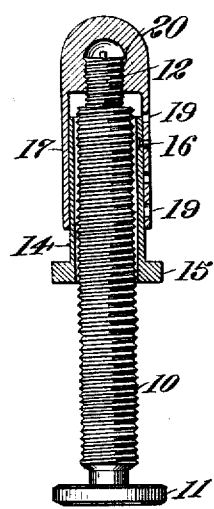
Fig. 2 is a view in longitudinal section and elevation, showing the details of construction of the present invention.
Figure 1:
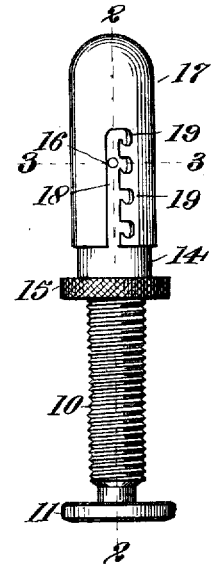
Figure 1 is a view in elevation, showing the present invention as applied to a valve stem which is dissociated from a tire.
Figure 3:
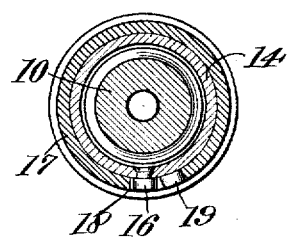
Fig. 3 is a view in transverse section through the cap, as seen on the line 3—3 of Fig. 1.

In the drawings, 10 indicates a cylindrical externally threaded valve stem of common construction. These stems are formed with a central passageway having appropriate seats for receiving a tire valve, the construction of which will not be discussed in the present application. The lower end of the valve stem is formed with an enlarged shoulder 11, by which the stem is secured in position within the tire tube. The opposite end of the valve stem is formed with a reduced portion 12 which is also externally threaded and usually receives a small valve cap by which the opening in the end of the stem may be sealed. Mounted upon the valve stem 10 is a sleeve 14 which is cylindrical of an inside diameter substantially that of the outside of the stem, and a length considerably less than the length of the stem. This sleeve is formed with an enlarged knurled shoulder 15, by which it may be easily handled. At a point midway its ends, a lock pin 16 is secured. This pin extends radially from its outer surface for a purpose which will be hereinafter set forth.

Telescoping over the sleeve is a cap 17. The internal diameter of this cap substantially agrees with the external diameter of the sleeve 14, thus making a practically tight fit when positioned thereover. This cap is formed with a longitudinal slot 18 in its side, which permits it to pass down around the pin 16. A plurality of recesses or notches 19 are formed in one side of this slot and so arranged as to provide seats for the pin when the cap member is rotated in relation to the sleeve. As shown in Fig. 2 of the drawings, the closed end of the cap is formed of solid material and has a reduced threaded bore 20 for receiving the extension 12 of the valve stem.

In operation of the present invention the stem is applied to a tire and the tire structure thereafter mounted upon its wheel felly. The sleeve 14 may be slipped over the valve stem and pressed down against the wheel felly. The cap may then be mounted over the stem and the sleeve, thereafter being forced downwardly so that the pin 16 will move toward the closed end of the slot 18. As this motion continues the reduced end portion 12 of the valve stem will encounter the bore 20 of the cap, after which the cap is rotated. As it rotates, it will move in relation to the sleeve and cause one of its recesses 19 to register with the pin. As the rotation continues, it will thus be seen that the sleeve and cap will both be screwed down upon the threaded portions of the reduced valve stem portion 12. This threading action can continue until the two members are locked. Removal of the cap may be easily effected by rotating the stem and its sleeve in a reverse direction until the extension 12 has been cleared by the bore 20, after which the cap may be instantly removed by disengaging the pin from its recess and into the longitudinal groove.

It will thus be seen that by the use of the device here disclosed, an effective cover will be provided for the threads of the stem and the end of the cap, at the same time insuring that the cap may be applied or removed from its covering position by merely rotating it the length of the short threaded extension 12, thus saving considerable time and eliminating the use of one cap which is now required.

While I have shown the preferred form of my invention, various changes in the construction and arrangement of the several parts herein shown and described may be resorted to without departing from the spirit of my invention as disclosed in the appended claims.

Having thus described my invention, what I claim and desire to secure by Letters Patent is—

1. In combination with a tire valve stem, a sleeve upon the body portion of the stem, a cap adapted to telescope thereover and fitted with a closed threaded end into which the end of the valve stem may be screwed, a bayonet slot formed in the side of the cap, and a protrusion formed upon said sleeve for engagement with said slot.

2. A tire valve stem having a reduced threaded outer end, a sleeve slidable on the exterior of the stem and adjustable in contact with the wheel felly, a cap the outer closed end of which is threaded to engage the threaded end of the valve stem, and the main portion of which is telescopically slidable over the sleeve, a longitudinal slot in the cap with notches on one side, and a pin projecting from the sleeve into the slot and engageable with the notches by turning the cap upon the threaded end of the valve stem, to lock the sleeve and cap members.

In testimony whereof I have hereunto set my hand in the presence of two subscribing witnesses.

ROBERT H. SIMPSON.

Witnesses:
THOMAS L. CURAS,
CHAS. NURNBERGER.